April 12, 1927.

J. P. SALMI

SAW

Original Filed Jan. 25, 1924

1,624,072

Inventor
Johan P. Salmi
By H. J. Sanders
Atty.

Patented Apr. 12, 1927.

1,624,072

UNITED STATES PATENT OFFICE.

JOHAN PAUL SALMI, OF CHICAGO, ILLINOIS.

SAW.

Application filed January 25, 1924, Serial No. 688,425. Renewed September 13, 1926.

This invention relates to improvements in tree saws and its object is to provide a manually operated saw adapted for cutting down standing trees. Efficiency and ease of operation are objects obtained. With the foregoing and other objects in view the invention consists in the combination and arrangement of parts to be hereinafter fully described, pointed out in the appended claims and illustrated in the accompanying drawing which forms a part of this application and in which—

Like reference characters denote corresponding parts in both views.

Figure 1:
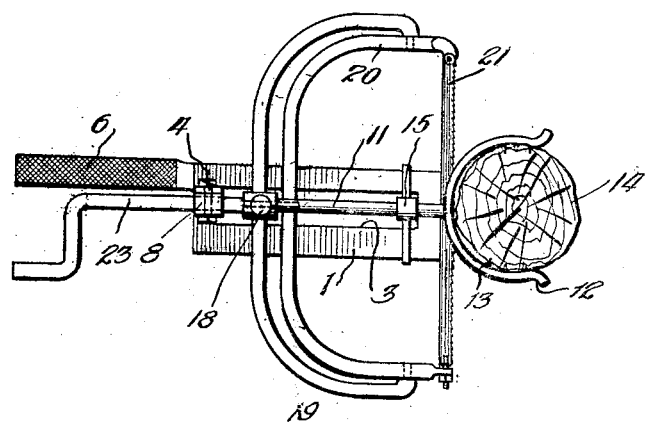
Fig. 1 is a plan view of the saw illustrating its application.

The reference numeral 1 denotes a platform having downturned lateral edges 2 that serve to support the same, said platform being formed with a centrally disposed longitudinally extending opening 3. Arranged upon one end of the platform is an integral standard 4 formed with an elongated slot 5, said standard being formed with an integral extension or shoe 6, disposed substantially at right angles to the said standard and adapted to rest upon the ground, said shoe being provided with a plurality of teeth or spurs 7 adapted to bite into the earth, said spurs being curved rearwardly thus preventing the shoe from slipping or creeping in one direction after it has been located.

Figure 2:
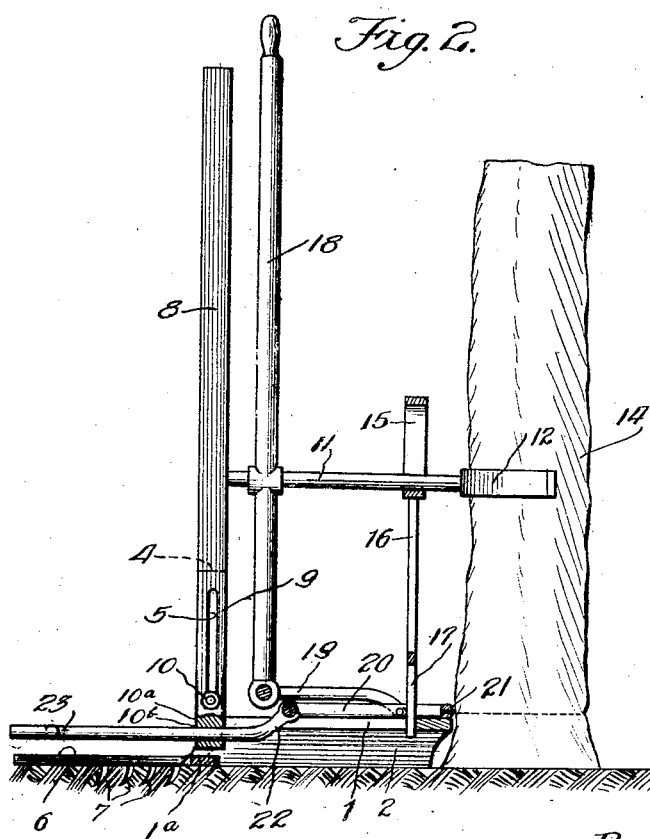
Fig. 2 is a view of Fig. 1 in side elevation.
Figure 3:
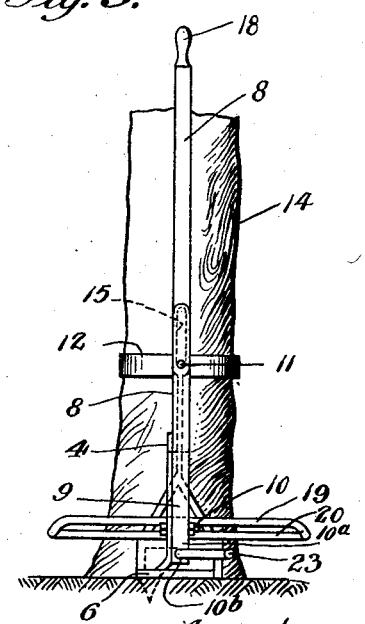
Fig. 3 is a view at right angles to the left side of Fig. 2.

An upright 8 is formed with a diminished portion 9 adapted to lie flat against the standard 4 to support the same, said portion 9 being slotted longitudinally, said slot being adapted to align with the slot 5 in said standard so that an adjusting bolt 10 may connect the slotted portions of said members to secure them in adjusted position. The upright terminates at its lower end in a base 10$^a$ formed with a transverse perforation 10$^b$. By loosening the nut upon the bolt 10 the upright may be adjusted relative to the standard; from the position shown in Fig. 2 it may be raised.

A bar 11 carried by the upright 8, and disposed at right angles thereto, is provided with a fork 12 provided with teeth 13, said fork and teeth being adapted to partially encircle and bite into the tree trunk 14 to steady the saw during its operation. The bar 11 extends through an elongated slotted head 15 carried by the stand 16, said slotted head serving to guide and brace said bar 11, said stand being supported by a forked base 17 arranged upon the platform 1, the depending sides of which are connected by the cross brace 1$^a$. The slot in the said head 15 permits the bar 11 to be adjusted relative to the said head as the saw is raised or lowered.

Pivotally and slidably arranged upon the bar 11 is the rock lever 18 made fast to and operating the outer frame 19 the ends of which pivotally support and operate the saw blade frame 20 that carries the saw blade 21, said blade frame 20 being slidably supported by a fork 22 that is integral with and terminates the angular follower lever 23 that slides in the transverse perforation 10$^b$ in the base 10$^a$, the outer bent end of said follower lever being adapted for engagement by the operator's leg whereby said lever, saw blade frame and connections may be moved forward or toward the tree to be, or being, cut.

In operation the operator may stand with one foot upon the shoe 6 and one leg, at about the ankle, engaging the bent outer end of the follower lever 23 to cause the saw blade to contact with the trunk of the tree 14. With one hand he oscillates the rock lever 18 thus reciprocating the frames 19, 20 which cause the blade 21 to cut the tree trunk. The lever 18 or the follower lever 23, or both, may be used to advance the saw blade as the tree is cut. To raise the saw from the position shown in Fig. 2 the nut upon bolt 10 is loosened and the upright 8 raised together with the follower lever, carried thereby, and the bar 11 which is also carried by the upright 8. The fork 12 bearing against the tree trunk tends to prevent it from falling toward the saw when cut. Of course the tree trunk diametrically opposite the saw blade, will be chipped or cut with an ax in the usual manner previous to the start of the sawing operation.

What is claimed is:—

1. In a tree saw, a platform, an upright supported thereupon and adjustable relative thereto, tree engaging means carried by said upright, a rock lever carried by said means, a frame carried by said rock lever, a second frame carried by said first named frame, a blade for said second frame, and supporting means for said second frame slidably carried by said upright.

2. In a tree saw, a platform, an upright supported thereupon and adjustable relative thereto, tree engaging means carried by said upright, a rock lever carried by said means, a frame carried by said rock lever, a second frame carried by said first named frame, a blade for said second frame, and a follower lever slidably carried by said upright and operatively supporting said second frame.

3. In a tree saw, a platform, an upright supported thereupon and adjustable relative thereto, tree engaging means carried by said upright, a rock lever carried by said means, a frame carried by said rock lever, a second frame pivotally carried by said first named frame, a blade for said second frame, an angular follower lever slidably carried by said upright, and a fork integral with said follower lever and operatively supporting said second frame.

4. In a tree saw, a platform, an upright supported thereupon and adjustable relative thereto, a bar carried by said upright at right angles thereto, a toothed fork terminating said bar, a rock lever fulcrumed slidably upon said bar, a frame carried by said rock lever, a second frame pivotally carried by said first named frame, a blade for said second frame, and a follower lever slidably carried by said upright and operatively supporting said second frame.

In testimony that I claim the foregoing as my own I have hereto affixed my signature.

J. PAUL SALMI.